(12) United States Patent  
Huslak et al.

(10) Patent No.: US 8,589,810 B2
(45) Date of Patent: Nov. 19, 2013

(54) METHODS, SYSTEMS, AND PRODUCTS FOR RECORDING BROWSER NAVIGATIONS

(75) Inventors: Nicholas S. Huslak, Johns Creek, GA (US); Karen Mullis, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 645 days.

(21) Appl. No.: 12/272,849

(22) Filed: Nov. 18, 2008

(65) Prior Publication Data

US 2010/0125802 A1    May 20, 2010

(51) Int. Cl.
*G06F 3/00* (2006.01)

(52) U.S. Cl.
USPC .................. 715/760; 715/716; 715/719

(58) Field of Classification Search
USPC .......................... 715/760, 716, 719
See application file for complete search history.

(56) References Cited

U.S. PATENT DOCUMENTS

| | | | |
|---|---|---|---|
| 6,101,510 A | 8/2000 | Stone et al. | |
| 6,667,751 B1 | 12/2003 | Wynn et al. | |
| 7,043,546 B2* | 5/2006 | Smith et al. | 709/224 |
| 7,072,935 B2* | 7/2006 | Kehoe et al. | 709/203 |
| 7,210,094 B2 | 4/2007 | Dovin et al. | |
| 7,287,232 B2 | 10/2007 | Tsuchimura et al. | |
| 7,296,062 B2 | 11/2007 | Bengi et al. | |
| 7,398,308 B2 | 7/2008 | Friedel et al. | |
| 7,401,287 B2 | 7/2008 | Suzuki | |
| 7,647,561 B2* | 1/2010 | Zondervan | 715/762 |
| 7,653,896 B2* | 1/2010 | Herdeg, III | 717/113 |
| 2004/0111488 A1* | 6/2004 | Allan | 709/217 |
| 2007/0006067 A1 | 1/2007 | Kikuchi | |
| 2007/0118811 A1 | 5/2007 | Tsuchimura et al. | |
| 2007/0150618 A1 | 6/2007 | Yoshida | |
| 2008/0126931 A1* | 5/2008 | Kojima et al. | 715/704 |
| 2009/0222727 A1* | 9/2009 | George et al. | 715/704 |

\* cited by examiner

*Primary Examiner* — David Phantana Angkool
(74) *Attorney, Agent, or Firm* — Scott P. Zimmerman, PLLC

(57) ABSTRACT

Methods, systems, and products are disclosed for recording a navigational sequence. A selection is received to record the navigational sequence to a destination web page. A browser application requests a sequence of uniform resource locators and downloads the destination web page. The browser application records the sequence of uniform resource locators. Another selection is received that stops recording the navigational sequence.

20 Claims, 17 Drawing Sheets

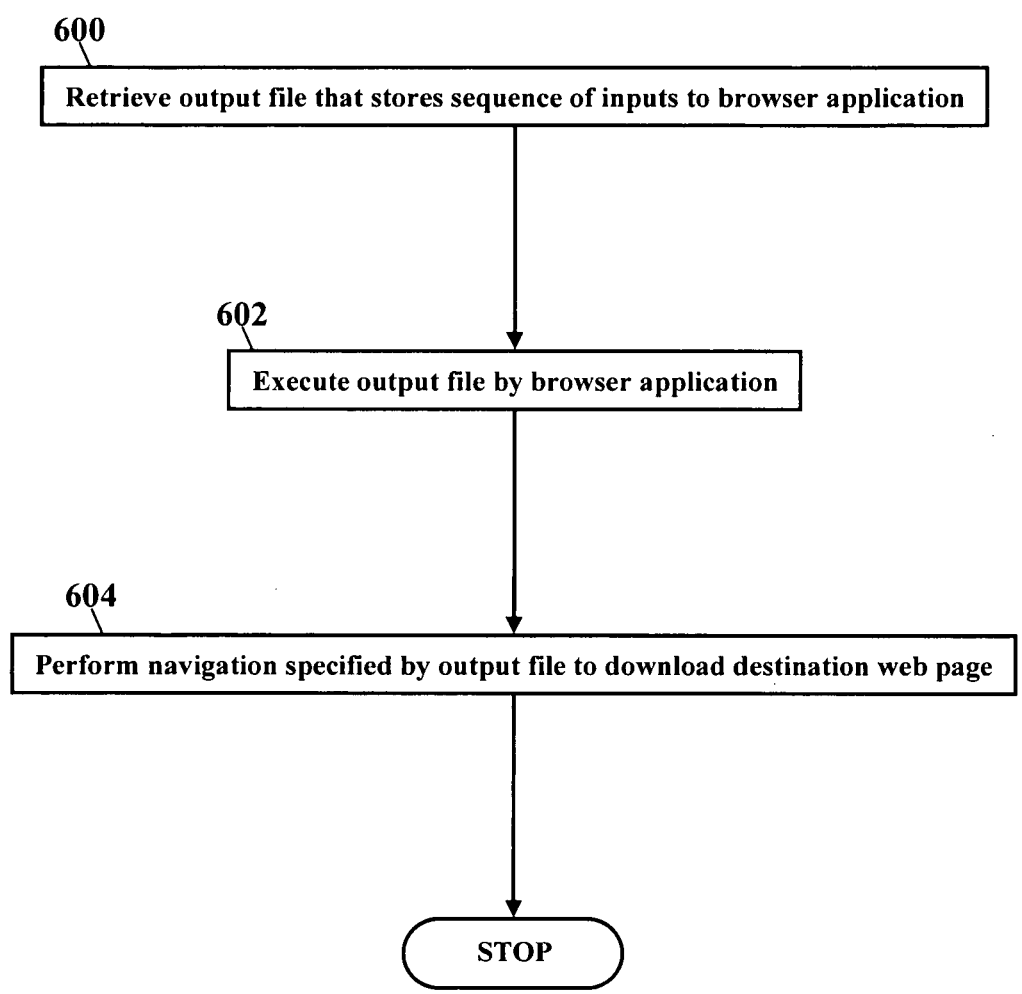

METHODS, SYSTEMS, AND PRODUCTS FOR RECORDING BROWSER NAVIGATIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Exemplary embodiments generally relate to data processing and to computers and, more particularly, to database structures for information retrieval, to computer-to-computer data modifying, and to presentation processing of documents.

Navigating websites can be difficult. When people want to share content available from a website, many people email one or more instances of a uniform resource locator (or "URL"). These uniform resource locators identify a network location of shared content. Many readers, for example, may have emailed a uniform resource locator to a recipient, thus allowing the recipient to download pictures, news, and other content of interest. Unfortunately, though, some web locations (and perhaps even intermediate steps along the way to a web location) are not directly reachable by simply clicking or selecting a corresponding uniform resource locator, so users have difficulty sharing the content. Some web locations, for example, link to a programming "script" that takes over a browser and navigates to a final website destination. Other web locations may require authentication at a portal website before navigating to the final website destination. For web locations like these, users may find it difficult to determine the uniform resource locators that must be navigated to reach the final website destination. Users may thus benefit from new concepts that allow sharing of website content without requiring adherence to a complicated, unknown, or even inaccurate list of uniform resource locators and manual navigation instructions (e.g., "click on the course name, enter your login credentials on the resulting page, then click on the course name, . . . ").

SUMMARY

Exemplary embodiments provide methods, systems, and products for recording navigational sequences. As a user navigates the Internet to a destination web page, exemplary embodiments allow the user to record those navigational steps. Exemplary embodiments thus record a sequence of uniform resource locators that are requested and/or downloaded to finally reach the desired destination web page. When the user reaches the destination web page, the user may then stop the recording and generate an output file identifying or containing the navigation sequence. The output file may then be shared with other users. The shared output file may cause a recipient's browser application to automatically navigate to the same destination web page. The recipient, then, was not forced to adhere to a complicated, and possibly inaccurate, list of uniform resource locators and navigation instructions to reach the destination web page. The recipient, instead, is automatically, fairly quickly, and simply led to the destination web page, thus allowing users to quickly and easily share content.

Exemplary embodiments include a method for recording a navigational sequence. A selection is received to start recording the navigational sequence to a destination web page. A browser application requests a sequence of uniform resource locators and downloads the destination web page. The browser application records the sequence of uniform resource locators. Another selection is received that stops recording the navigational sequence.

More exemplary embodiments include a system for recording a navigational sequence. A browser application is stored in memory and a processor processes the browser application. The processor receives a selection to start recording the navigational sequence to a destination web page. The browser application causes the processor to request a sequence of uniform resource locators and to download the destination web page. The processor records the sequence of uniform resource locators. The processor receives another selection to stop recording the navigational sequence.

Still more exemplary embodiments include a computer readable medium that stores processor-executable instructions for performing a method of recording a navigational sequence. A selection is received to start recording the navigational sequence to a destination web page. A sequence of uniform resource locators is requested and the destination web page is downloaded. The sequence of uniform resource locators is recorded. Another selection is received that stops recording the navigational sequence.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIGS. 16 and 17 are flowcharts illustrating a method of recording a navigational sequence, according to exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
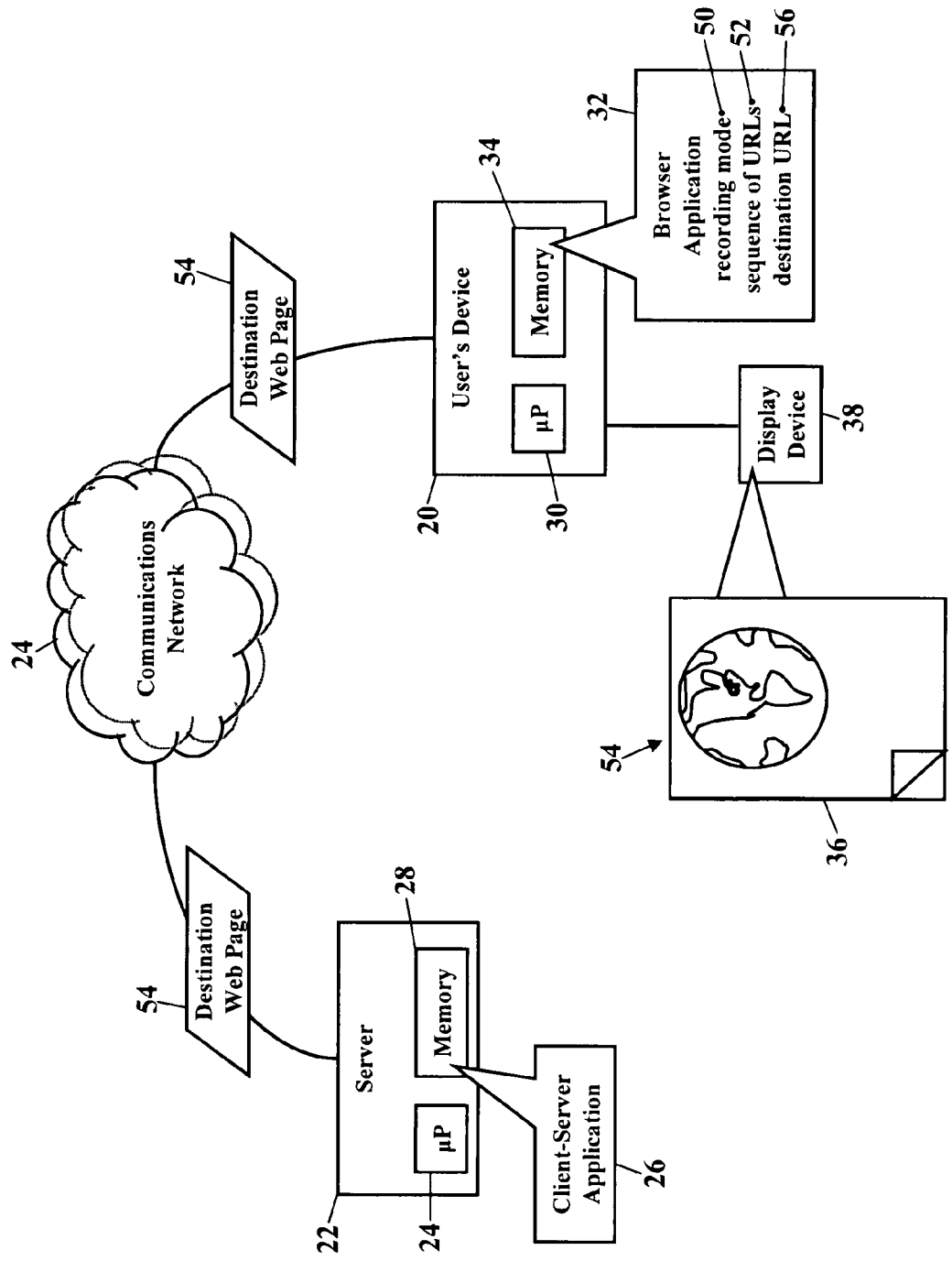
FIGS. 1 and 2 are simplified schematics illustrating an environment in which exemplary embodiments may be implemented.
Figure 2:
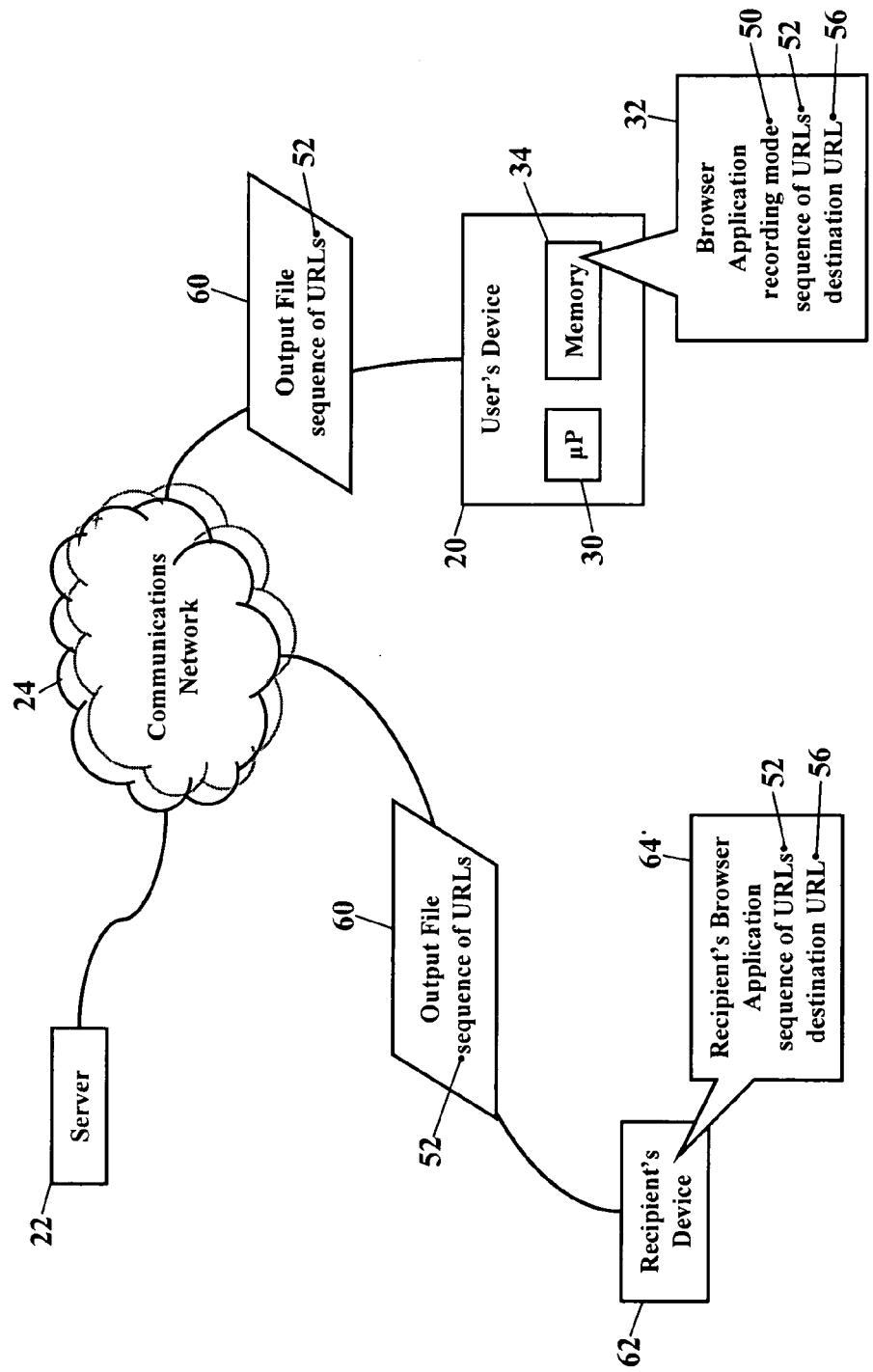

FIGS. 1 and 2 are simplified schematics illustrating an environment in which exemplary embodiments may be implemented. A user's device 20 communicates with a server 22 via a communications network 24. Although the user's device 20 is generically shown, the user's device 20, as will be later explained, may be a computer, a browser-enabled radio, a personal digital assistant (PDA), a browser-enabled digital music player, or any other processor-controlled device. The server 22 has a processor 25 (e.g., "μP"), application specific integrated circuit (ASIC), or other device that executes a client-server application 26 stored in a memory 28. The user's device 20 may also have a processor 30 (e.g., "μP"), application specific integrated circuit (ASIC), or other device that executes a browser application 32 stored in memory 34. The client-server application 26 and/or the browser application 32 may cooperate to cause the user's device 20 to navigate the communications network 26 and to produce a graphical user interface 36. The graphical user interface 36 is illustrated as being visually produced on a display device 38, yet the graphical user interface 36 may also have audible features.

Here, though, the browser application 32 may record navigational steps. The browser application 32 may have a recording mode 50 of operation. According to exemplary embodiments, the browser application 32 is a set of processor-executable instructions that store, or record, a sequence 52 of uniform resource locators ("URLs") that are requested and/or downloaded to arrive at a destination web page 54 (e.g., a destination uniform resource locator 56). As FIG. 1 illustrates, the destination web page 54 is retrieved from the server 22 and communicated along the communications network 24 to the user's device 20. As later paragraphs will explain, the browser application 32 may also record any inputs (such as "clicks" or selections) and/or authentication information (e.g., username and password) entered in an intervening website.

FIG. 2 illustrates the sharing of navigational experiences. According to exemplary embodiments, when the user's device 20 reaches the destination uniform resource locator 56 associated with the destination web page (illustrated as reference numeral 54 in FIG. 1), the browser application 32 may be instructed to stop recording the sequence 52 of uniform resource locators and other information (such as clicks and inputs). The browser application 32 may then generate an output file 60 that can be sent to another destination. The output file 60 may comprise the sequence 52 of uniform resource locators and other information that was recorded by the user's browser application 32. The user may then send the output file 60 to a recipient, and the output file 60 allows the recipient to automatically navigate to the same destination uniform resource locator 56. FIG. 2, for example, illustrates the output file 60 being sent to a recipient's device 62. The recipient's device 62 executes a recipient's browser application 64. When the recipient's device 62 receives the output file 60, the recipient's browser application 64 reads and/or executes the output file 60 and automatically requests the same sequence 52 of uniform resource locators to arrive at the same destination uniform resource locator 56 (associated with the destination web page 54 illustrated in FIG. 1). Both the user's device 20 and the recipient's device 62 have thus downloaded the same destination web page 54, without conducting a laborious and confusing explanation of the navigational steps.

The user's device 20 and the server 22 are only simply illustrated. Because the architecture and operating principles of these devices are well known, their hardware and software components are not further shown and described. If the reader desires more details, the reader is invited to consult the following sources: ANDREW TANENBAUM, COMPUTER NETWORKS (4th edition 2003); WILLIAM STALLINGS, COMPUTER ORGANIZATION AND ARCHITECTURE: DESIGNING FOR PERFORMANCE (7th Ed., 2005); and DAVID A. PATTERSON & JOHN L. HENNESSY, COMPUTER ORGANIZATION AND DESIGN: THE HARDWARE/SOFTWARE INTERFACE (3rd. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The communications network 24 may even include powerline portions, in which signals are communicated via electrical wiring. The concepts described herein may be applied to any wireless/wireline communications network, regardless of physical componentry, physical configuration, or communications standard(s).

Figure 3:
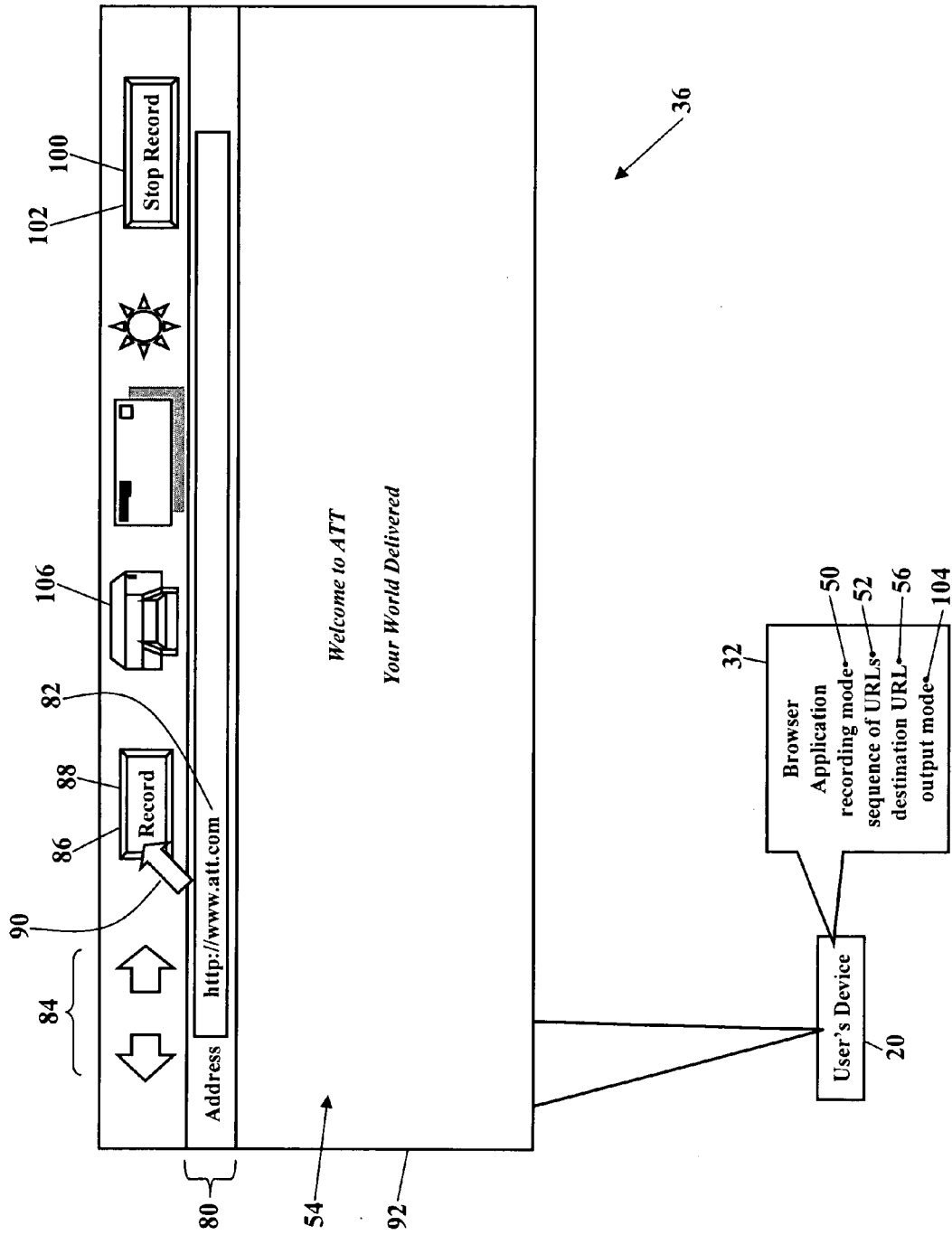
FIG. 3 is a schematic illustrating a graphical user interface, according to exemplary embodiments.

FIG. 3 is a schematic illustrating the graphical user interface 36, according to exemplary embodiments. The graphical user interface 36 is illustrated with generic features that are common to many browser applications (such as MICROSOFT® EXPLORER® and MOZILLA® FIREFOX®). An address bar 80 displays a domain name 82 of a requested or downloaded web site, and navigation controls 84 allow the user to navigate to recently visited web sites. Here, though, the graphical user interface 36 includes a "Record" icon 86. The "Record" icon 86 may be a graphical control 88 that causes the browser application 32 to record a navigational sequence to the destination uniform resource locator 56. When the user places a pointer 90 and selects the "Record" icon 86, the browser application 32 enters the recording mode 50 of operation. The user then enters a uniform resource locator into the address bar 80, the browser application 32 issues a request for the uniform resource locator, and the browser application 32 downloads the requested uniform resource locator. The browser application 32 records or logs the requested uniform resource locator to the memory (illustrated as reference numeral 34 in FIG. 1) as well as any user action (such as clicking on various elements within the web resulting web page). The browser application 32 may also tag, associate, or append a time stamp to the requested uniform resource locator. The user then repeats this request-and-download process until the destination web page 54 (having the corresponding destination uniform resource locator 56) is reached. The browser application 32 downloads and visually displays the destination web page 54 in a viewing pane 92 of the graphical user interface 36. The browser application 32 thus successively stores and timestamps each requested, intervening uniform resource locator and associated user action(s). Because the process of requesting and downloading web pages in the browser application 32 is well-known, no detailed explanation is needed.

The user then selects a "Stop Record" icon 100. When the destination web page 54 (having the corresponding destination uniform resource locator 56) is finally downloaded, the user may wish to stop recording the navigational sequence. The user places the pointer 90 and selects the "Stop Record" icon 100. The "Stop Record" icon 100 may be another graphical control 102 that causes the browser application 32 to exit the recording mode 50 of operation and enter an output mode 104 of operation. Exemplary embodiments, however, may also automatically stop the recording of the navigational sequence. When, for example, the user fails to navigate to a new uniform resource locator after a predetermined period of time, the browser application 32 may infer that navigation has ended and, thus, stop recording. After each uniform resource locator has been requested, the browser application 32 may establish a timer. If the time elapses (e.g., counts down to zero), and another uniform resource locator has been requested, then the browser application 32 may stop recording.

As the above paragraphs mentioned, the browser application 32 records uniform resource locators and user actions. As the user navigates to the destination uniform resource locator 56, the user may "click" or select links or elements that appear in any intermediate webpage in the navigational sequence. For example, suppose the user is navigating websites to enroll in a class. The user might be required to authenticate and then to make several department and course selections before finally arriving at the desired course. While some of these "clicks" might lead to URLs that can be listed in the recording mode 50 of operation, some clicks will not lead to URLs, but, instead, run scripts on the current page that may open another window, open another URL, or other operations. Exemplary embodiments, then, record any user actions taken or inputted in any intermediate web page on the way towards navigating to the destination uniform resource locator 56.

Exemplary embodiments may be applied to any style of icon and type of graphical control. The "Record" icon 86 and the "Stop Record" icon 100 may have any shape and design that respectively conveys the recording mode 50 of operation and the output mode of operation. Just as a printer icon 106 conveys a printer mode of operation, the "Record" icon 86 and the "Stop Record" icon 100 may be chosen to universally convey each respective operation. Moreover, exemplary embodiments are applicable to any type of graphical control. Even though button controls are illustrated and discussed, graphical sliders, pull-down menus, knobs, and any other control is suitable.

Figure 4:
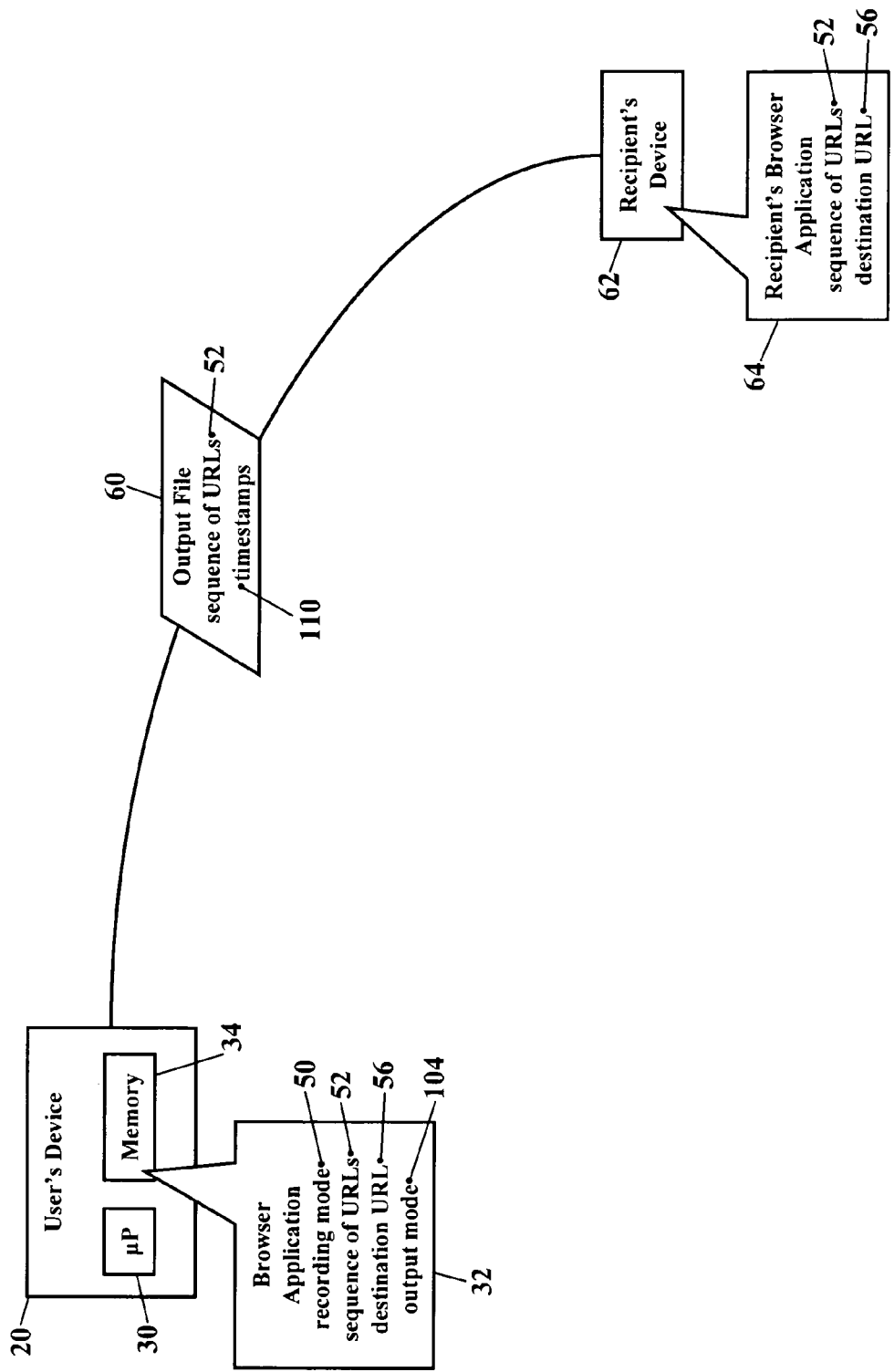
FIGS. 4 and 5 are schematics illustrating an output mode of operation, according to exemplary embodiments.
Figure 5:
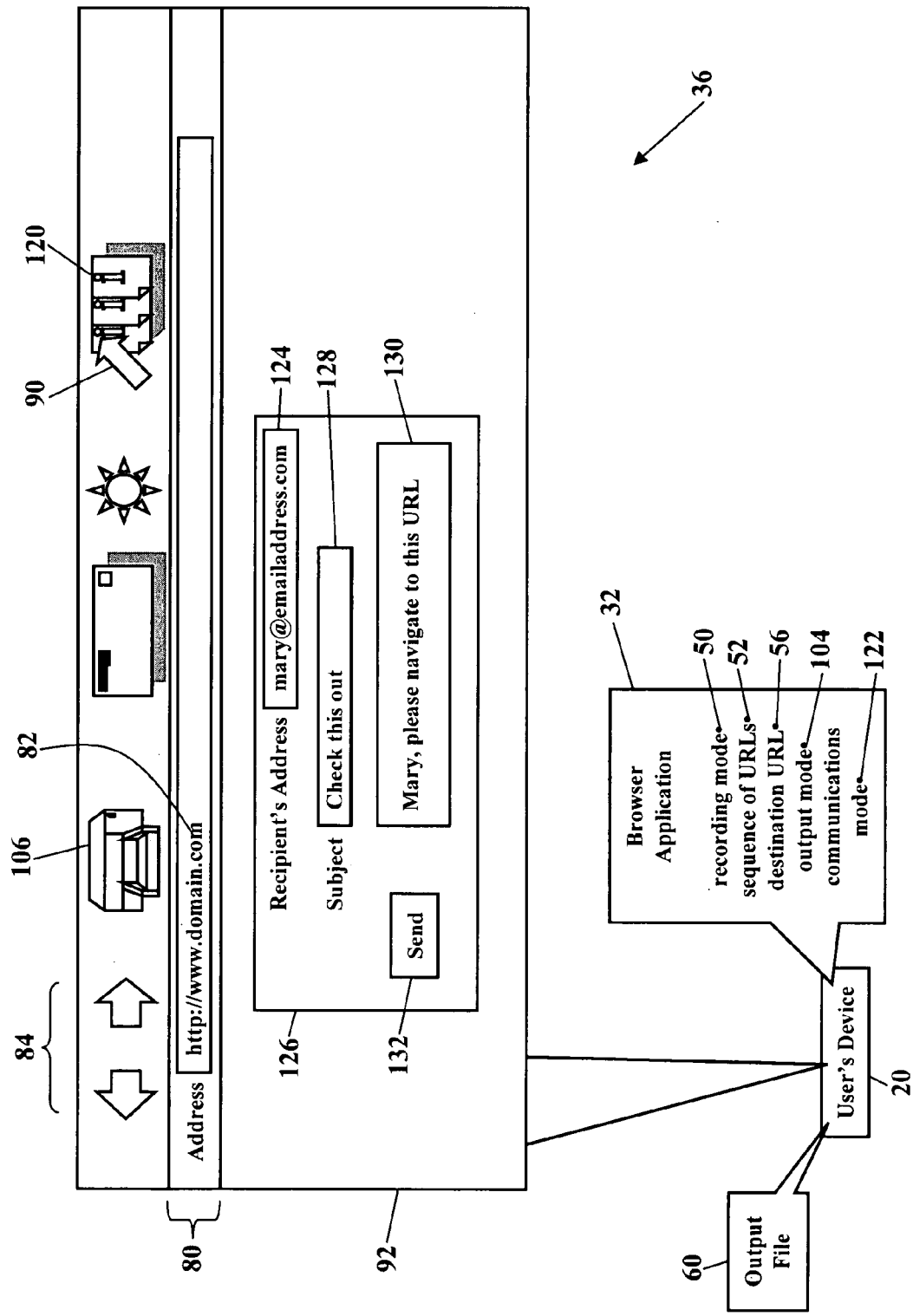

FIGS. 4 and 5 are schematics illustrating the output mode 104 of operation, according to exemplary embodiments. When the user stops recording the navigational sequence, exemplary embodiments generate the output file 60. As FIG. 4 illustrates, the browser application 32 generates the output file 60. The output file 60 may comprise the sequence 52 of uniform resource locators that were requested and downloaded to reach the destination uniform resource locator 56. The output file 60 may comprise any additional information, selections, or instructions recorded or inputted to reach the destination uniform resource locator 56. The output file 60, for example, may be generated as an executable file that stores and/or reads the sequence 52 of uniform resource locators. The output file 60, for example, may be generated as a WINDOWS® kernel file, LINUX® script, or JAVA® script having instructions that are executed by an operating system in the receiver's device 62. The output file 60, however, may additionally or alternatively contain the log or listing of the sequence 52 of uniform resource locators that were requested and downloaded to reach the destination uniform resource locator 56. The output file 60 may also contain each corresponding timestamp 110 for each uniform resource locator in the sequence 52 of uniform resource locators. The output file 60 is sent or communicated to a communications address (such as an Internet Protocol address or telephone number) associated with the recipient's device 62.

As FIG. 5 illustrates, the output file 60 may be visually represented with an output icon 120. The output icon 120 is illustrated as a sequence of pages, but any style and/or type of icon is suitable. When the user places the pointer 90 and selects the output icon 120, the output icon 120 may be yet another graphical control that causes the browser application 32 to enter a communications mode 122 of operation. The communications mode 122 of operation causes the browser application 32 to send the output file 60 to a destination address 124. FIG. 5, for example, illustrates an email dialog box 126 that is visually presented in the viewing pane 92 of the graphical user interface 36. The email dialog box 126 allows the user to compose an email comprising the output file 60. The user enters the destination address 124 and may add text to a subject line 128. The user may also compose a body 130 for the email. Here, though, when the user places the pointer 90 and selects a send icon 132, the output file 60 is sent to the destination address 124. The output file 60 may be automatically sent as an attachment to the email, or the output file 60 may be inserted within the body 130 of the email. Because the email dialog box 126 is well-known to those of ordinary skill in the art, the email dialog box 126 need not be further explained. Moreover, as those of ordinary skill in the art also understand, the communications mode 122 of operation may invoke other types of communications when communicating the output file 60. The output file 60, for example, may be communicated using an instant message, file transfer protocol, page, file download, voice over Internet Protocol call, and/or any other form of electronic communication.

Figure 6:
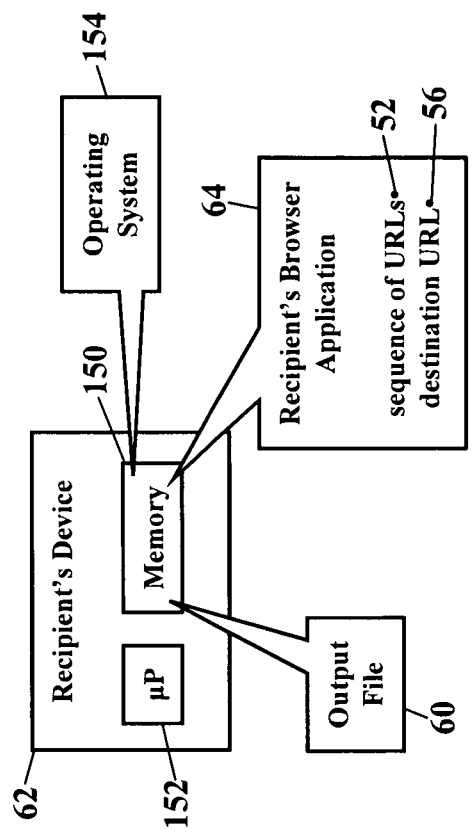
FIG. 6 is a schematic illustrating a recipient's device, according to exemplary embodiments.

FIG. 6 is a schematic illustrating the recipient's device 62, according to exemplary embodiments. When the recipient's device 62 receives the output file 60, the output file 60 is read by the recipient's browser application 64. The recipient's browser application 64 is stored in memory 150 of the recipient's device 62, and a processor 152 executes the recipient's browser application 64. The output file 60 causes the recipient's browser application 64 to automatically navigate to the same destination uniform resource locator 56. That is, the recipient's browser application 64 requests and downloads the same sequence 52 of uniform resource locators to reach the same destination web page (illustrated as reference numeral 54 in FIG. 1). The recipient's browser application 64 thus retraces the navigational "breadcrumbs" specified in the output file 60. If the output file 60 is an executable kernel or script file, the output file is automatically read and executed by the recipient's operating system 154. The recipient's device 62 has thus navigated to the same destination uniform resource locator 56, without conducting a laborious and confusing explanation of the navigational steps.

The recipient, of course, may want to first authorize any action or request. When the recipient's device 62 receives the output file 60, the recipient may want to authorize the output file 60 before execution by the recipient's browser application 64. The recipient may also authorize any requested and downloaded webpage in the sequence 52 of uniform resource locators to reaching the destination webpage 54. If the output file 60, for example, is from an unknown or untrustworthy source, the recipient may not want to be automatically navigated to the destination web page 54. Moreover, should the destination web page 54 (or any intermediate webpage in the sequence 52 of uniform resource locators) contain objectionable material, the recipient may want to decline the output file 60. The recipient's browser application 64, then, may first inform the recipient of the output file 60 and seek authorization to navigate to the destination web page 54. The recipient's browser application 64 may prompt the recipient to accept and to automatically navigate to the destination web page 54. The recipient's browser application 64 may even query for information associated with any intermediate webpage in the sequence 52 of uniform resource locators, such as subject matter, a rating, or other indication of content. If the recipient refuses automatic navigation, the output file 60 may be quarantined or discarded. If the user positively responds to the prompt and authorizes automatic navigation, the recipient's browser application 64 automatically executes the output file 60.

Figure 7:
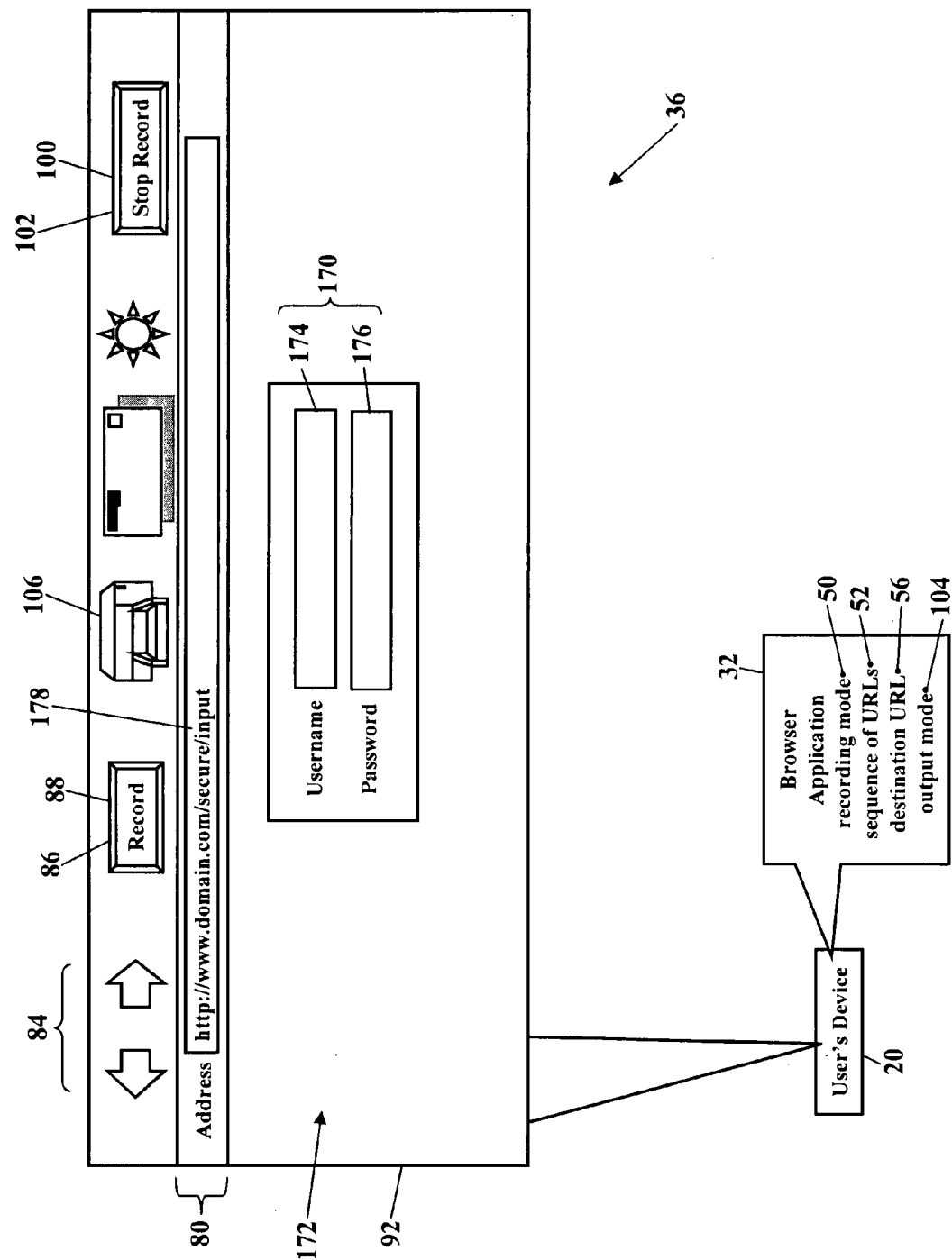
FIGS. 7 and 8 are schematics illustrating authentication information, according to exemplary embodiments.
Figure 8:
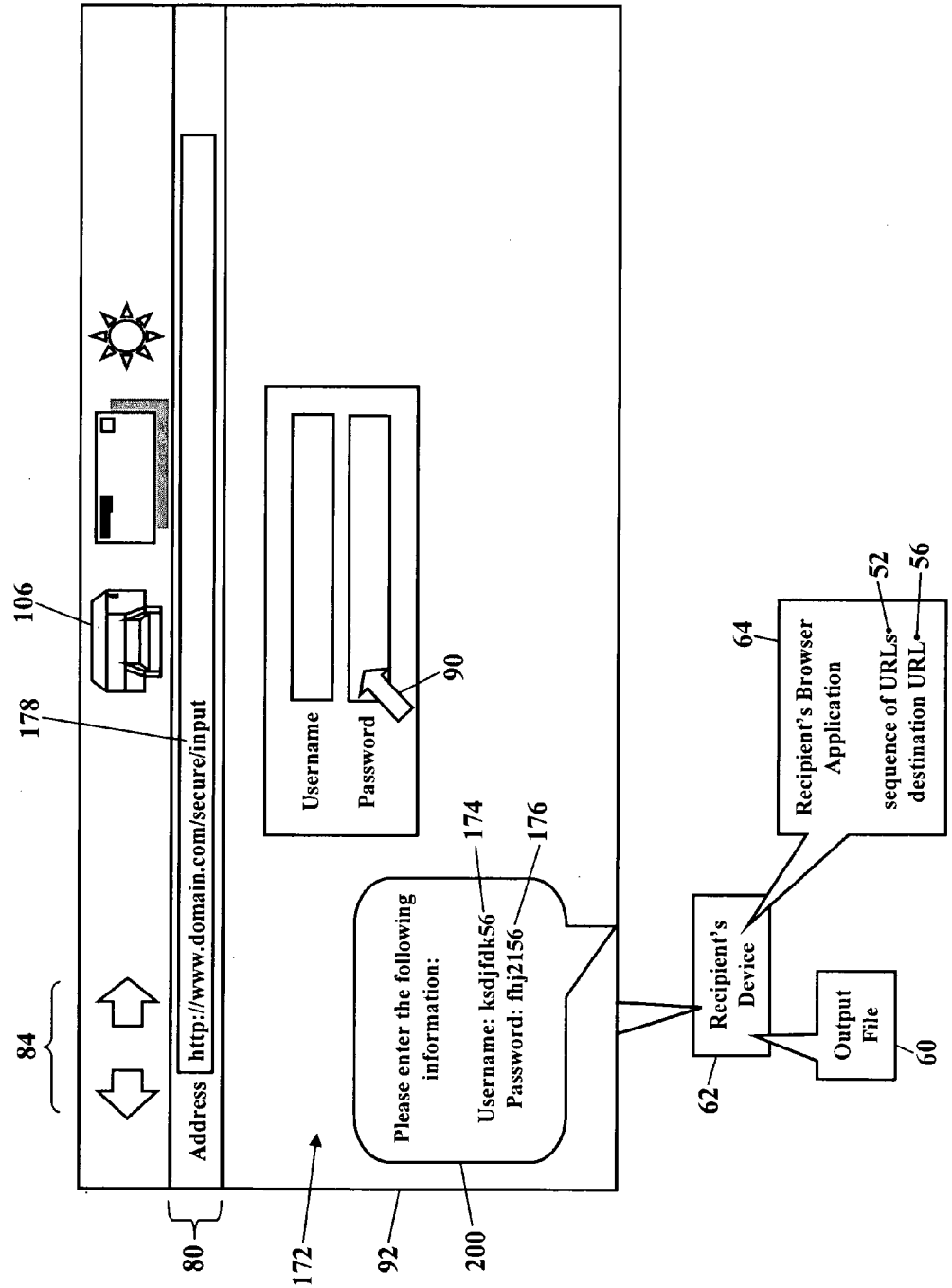

FIGS. 7 and 8 are schematics illustrating authentication information 170, according to exemplary embodiments. Here the user's browser application 32 may also record usernames, passwords, and other inputs that are entered to authenticate the user while navigating to the destination uniform resource locator 56. As the browser application 32 requests and/or downloads web pages, a secure web page 172 may require the user to enter the authentication information 170. FIG. 7, for example, generically illustrates the secure web page 172 as requiring input of a username 174 and a password 176. As those of ordinary skill in the art understand, the username 174 and password 176 are knowledge-based credentials that may be required to enter or download a secure website, communicate with a server, or access a network. Exemplary embodiments, then, may also record the authentication information 170 that is input when navigating the sequence 52 of uniform resource locators.

The recording mode 50 of operation, then, may store input information. The browser application 32, for example, may store a sequence of keyboard entries that are entered into text fields. Exemplary embodiments may prompt the user, at the user's device 20, to record these keyboard entries. When the user types or enters the username 174 and password 176, for example, exemplary embodiments may prompt the user to record the username 174 and password 176. If the user does not want to share authentication information, then the user may decline to record the username 174 and password 176. The user may prefer to have the recipient (at the recipient's device 62) enter their own authentication information. When, though, the user approves or authorizes the recording of the username 174 and password 176, then the corresponding keyboard or keypad entries may be associated with a uniform resource locator address 178 of the secure web page 172. The browser application 32 may thus store the username 174 and password 176 that the user enters to "drill down" beyond the secure web page 172. When the browser application 32 generates the output file 60, the output file 60 may contain the username 174 and password 176 associated with the uniform resource locator address 178 of the secure web page 172.

FIG. 8 illustrates an authentication page produced at the recipient's device 62. After the output file 60 is generated, the output file 60 is sent to the recipient's device 62. When the recipient's browser application 64 then executes the output file 60, the username 174 and password 176 are known. When the recipient's browser application 64 auto-executes the output file 60, the recipient's browser application 64 will eventually request and download the same uniform resource locator address 178 of the secure web page 172. According to exemplary embodiments, the secure web page 172 is displayed to the recipient, and the recipient must input the required authentication information 170. Here, though, the username 174 and password 176 are known. The output file 60 associates the uniform resource locator address 178 of the secure web page 172 to the username 174 and password 176. As FIG. 8 illustrates, the output file 60 may cause the recipient's browser application 64 to display or overlay an authentication dialog box 200. The authentication dialog box 200 displays the username 174 and password 176 associated with the uniform resource locator address 178 of the secure web page 172. The recipient may thus place the pointer 90 and manually input the username 174 and password 176. The recipient's browser application 64 may afterwards continue navigating the sequence 52 of uniform resource locators generated by the output file 60.

Exemplary embodiments may thus preserve the privacy of network directory structures. Because some websites are inaccessible to the public, the authentication information 170

(such as the username 174 and password 176) may be required for access. Exemplary embodiments preserve the privacy of these secure websites by not revealing network directory structures. Even though the output file 60 may comprise the sequence 52 of uniform resource locators, exemplary embodiments may only permit the recipient to view or access a home page address. Exemplary embodiments may prevent viewing and/or access to an underlying directory. The directory structure thus remains invisible and unknown, even though the output file's 60 script may be executing.

Figure 9:
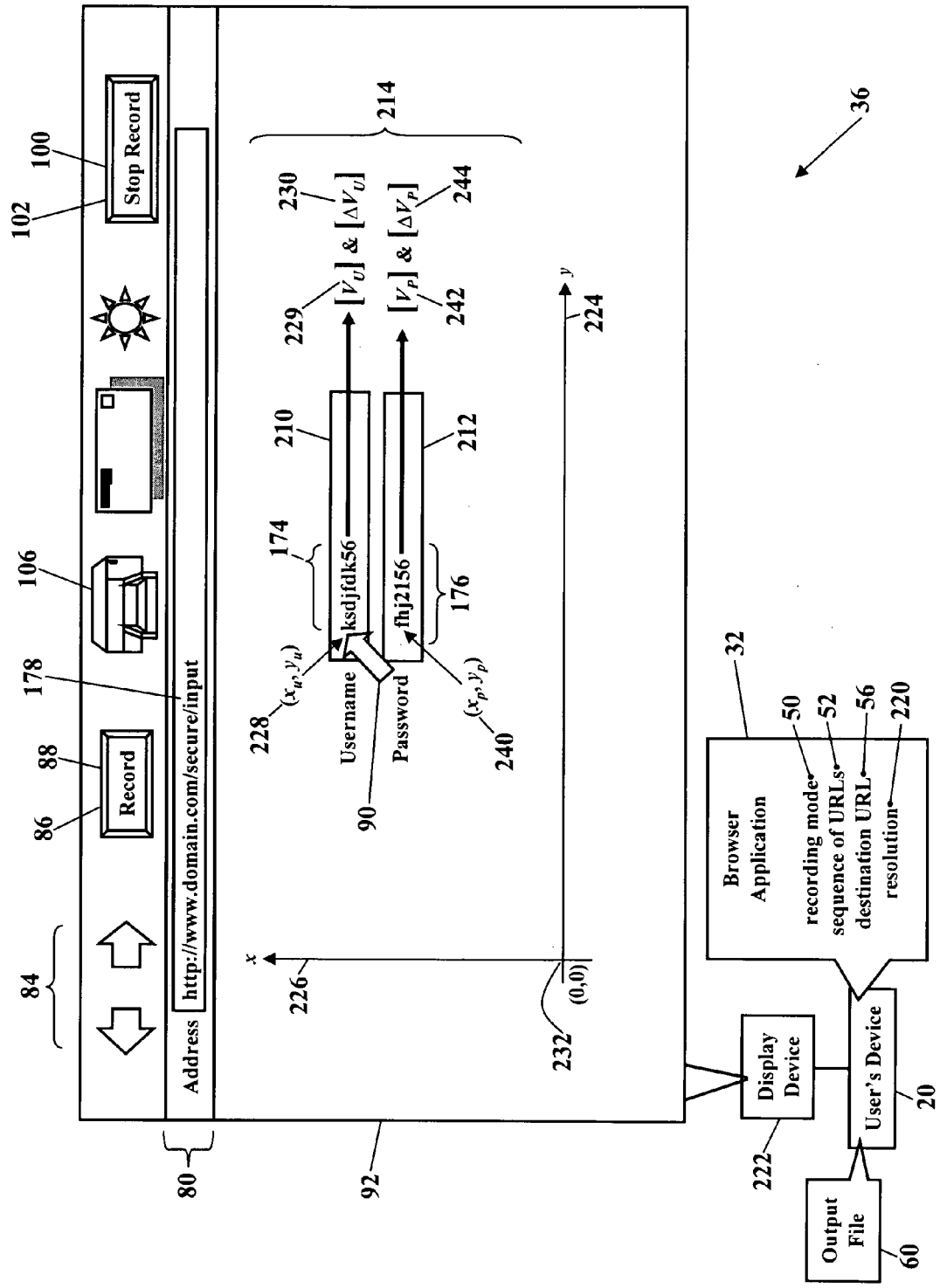
FIGS. 9-11 are schematics illustrating auto-entry of the authentication information, according to exemplary embodiments.
Figure 10:
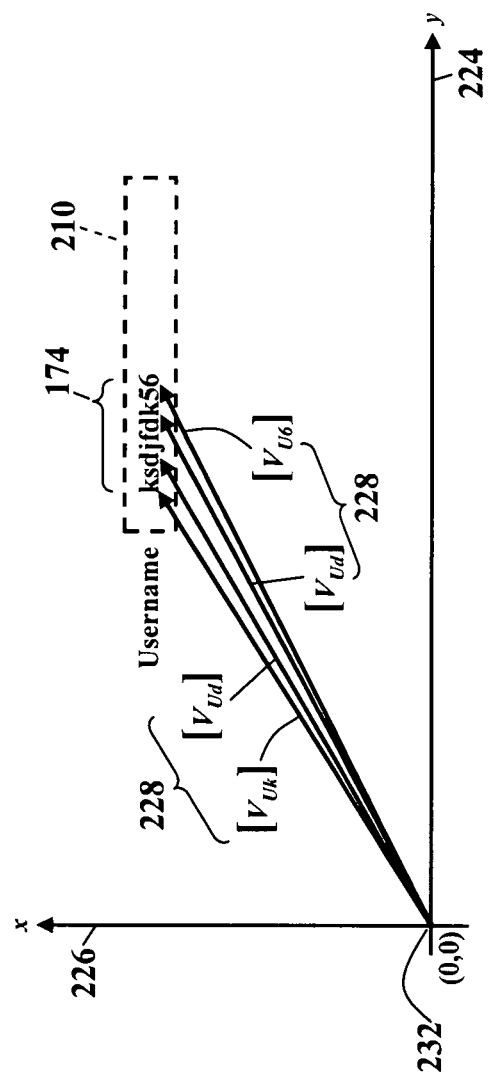
Figure 11:
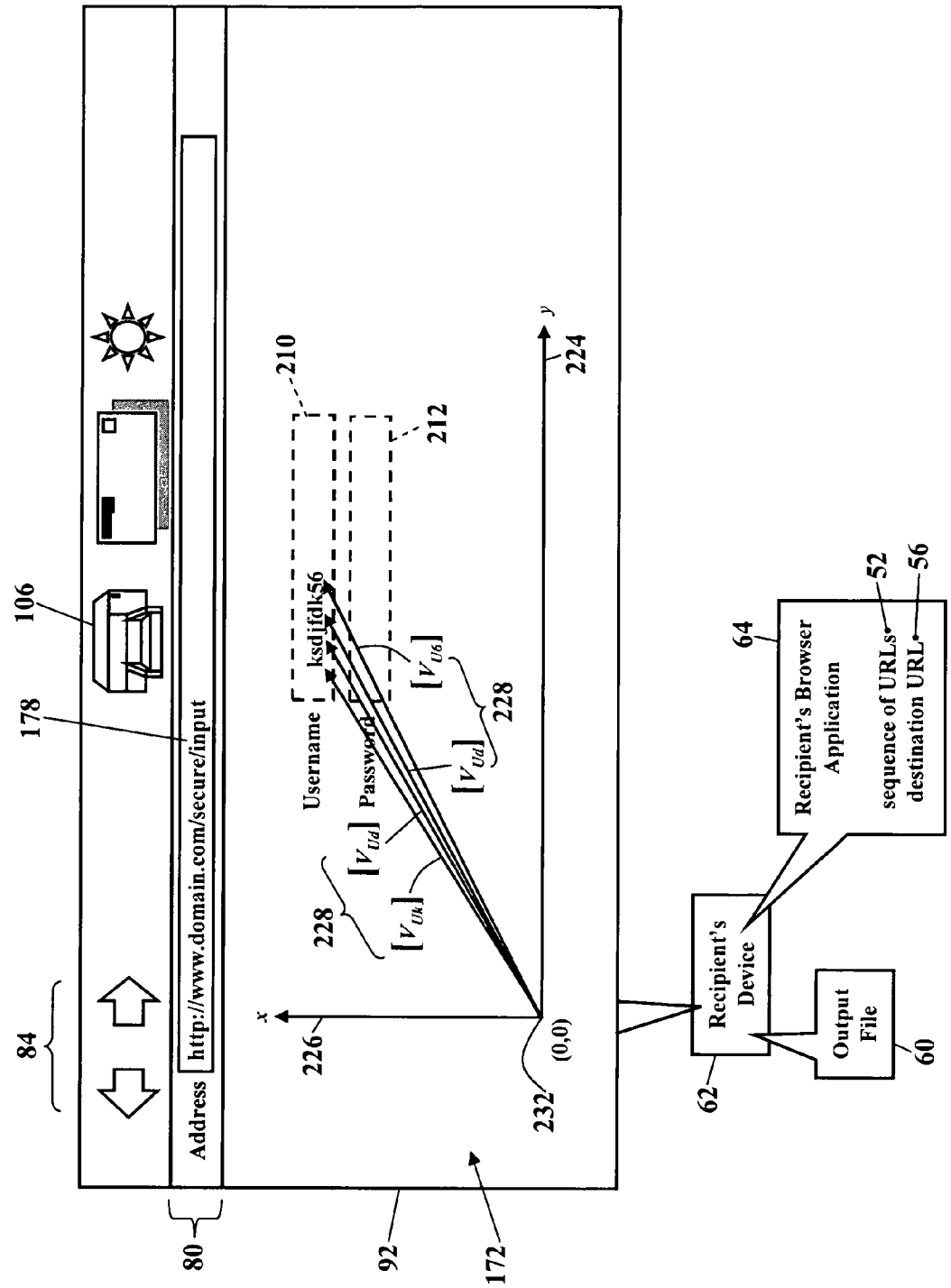

FIGS. 9-11 are schematics illustrating auto-entry of the authentication information 170, according to exemplary embodiments. Here the authentication information 170 may be automatically recorded and input to speed the navigation of the sequence 52 of uniform resource locators to the destination web page 54. FIG. 9 again generically illustrates the secure web page 172 requiring input of the username 174 and the password 176. When the user's device 20 operates in the recording mode 50 of operation, the browser application 32 stores the username 174 entered into a username field 210. The browser application 32 also stores the password 176 that the user enters in a password data field 212. The browser application 32 also associates the username 174 and password 176 to the uniform resource locator address 178 of the secure web page 172.

Here, though, exemplary embodiments may also determine screen coordinates 214. When the user places the pointer 90 in the username field 210 and enters the username 174, the browser application 32 determines the coordinates of the username field 210. When the user also places the pointer 90 in the password data field 212 and enters the password 176, the browser application 32 may also determine the coordinates of the password data field 212. As the following paragraphs explain, when the output file 60 is then generated, these screen coordinates 214 allow the recipient's browser application 64 to auto-enter the username 174 and password 176. Whereas FIGS. 7 and 8 required the recipient to manually enter the username 174 and password 176, here exemplary embodiments may speed-up the navigation to the destination web page 54.

The browser application 32 retrieves a resolution 220 of an associated display device 222. The resolution 220 may be measured in a number of pixels along a width or horizontal axis 224 and along a height or vertical axis 226. When the user places the pointer 90 in the username field 210, the browser application 32 determines a horizontal and vertical ($x_u$, $y_u$) coordinate 228 of the pointer 90. As the user types the username 174, the browser application 32 determines each successive coordinate ($x_{u+n}$, $y_{u+n}$) for each character in the username 174. As each character in the username 174 is entered into the username field 210, the browser application 32 may also project a username directional vector $\vec{V}_U$ (illustrated as reference numeral 229) representing the character-by-character direction of the typed username 174 within the username field 210.

The browser application 32 may also calculate a gradient 230 of the username directional vector 229. As the user types the username 174 into the username field 210, the user usually types the characters in a one-dimensional sequence. FIG. 9, for example, illustrates a horizontal orientation for the username field 210, so the username 174 is entered in a one-dimensional (e.g., x) direction. The username directional vector 229, then, would seem to be a simple, one-dimensional vector along the horizontal axis 224. Yet the screen coordinates 214 may have an origin (0,0) coordinate 232, from which all positions are referenced. As FIG. 10 illustrates, though, when the username directional vector 229 is determined from the perspective of the (0,0) origin 232, the username directional vector 229 is a two-dimensional vector that changes in two (e.g., x and y) dimensions. The browser application 32 may thus calculate the gradient 230 of each successive username directional vector 229 for each character in the username 174. The gradient 230 is a directional rate of change of the username directional vector 229, as measured from the origin coordinate 232. If $\vec{V}_U$ is the username directional vector 229 for a particular character, then the gradient 230 is $$\nabla V = a_x \frac{\partial V}{\partial x} + a_y \frac{\partial V}{\partial y}$$

The gradient 230 thus determines the directional rate of change as the user enters the username 174 into the username field 210.

Returning to FIG. 9, the browser application 32 similarly determines the screen coordinates 214 of the password 176. When the user places the pointer 90 in the password field 212, the browser application 32 determines a horizontal and vertical ($x_p$, $y_p$) coordinate 240 for each character entered into the password field 212. As the user types the password 176, the browser application 32 determines the corresponding coordinates for each successive character in the password 176. As each character in the password 176 is entered into the password field 212, the browser application 32 may also project a password directional vector $\vec{V}_p$ (illustrated as reference numeral 242) representing the character-by-character direction of the typed password 176 within the password field 212.

The browser application 32 may also calculate a corresponding gradient 244 of the password directional vector 242. From the perspective of the (0,0) origin 232, the password directional vector 242 is a two-dimensional vector that changes in two (x and y) dimensions. The browser application 32 may calculate the gradient 244 of the password directional vector 242 to determine the directional rate of change.

The recording mode 50 of operation may store the screen coordinates 214. As earlier explained, the browser application 32 associates the username 174 and password 176 to the uniform resource locator address 178 of the secure web page 172. The browser application 32, however, may also associate and store the screen coordinates 214 of each character entered into the username field 210 and into the password field 212. The browser application 32 may also associate and store the username directional vector 229, the gradient 230 of the username directional vector 229, the password directional vector 242, and the gradient 244 of the password directional vector 242. Any or all of these screen coordinates 214 may be stored and associated to the uniform resource locator address 178 of the secure web page 172. When the browser application 32 generates the output file 60, the output file 60 may contain these screen coordinates 214 associated with the uniform resource locator address 178 of the secure web page 172.

The output file 60 may then be sent to the recipient's device 62 for execution by the recipient's browser application 64. As FIG. 11 illustrates, the recipient's browser application 64 may auto-enter the screen coordinates 214. When the recipient's browser application 64 executes the output file 60, the screen coordinates 214 are known and associated to the uniform resource locator address 178 of the secure web page 172. When the recipient's browser application 64 requests and downloads the same uniform resource locator address 178 of the secure web page 172, here a response may be automatically formulated, thus perhaps relieving the recipient from inputting the username 174 and password 176. When the recipient's browser application 64 requests and downloads the secure web page 172, the recipient's browser application 64 retrieves the associated screen coordinates 214. The recipient's browser application 64, for example, obtains the screen coordinates 214 of each character that is entered into the username field 210. The recipient's browser application 64 retrieves and places each successive character in the username 174 at the corresponding coordinates specified by each corresponding username directional vector 229. The recipient's browser application 64 thus ensures the characters are properly entered into the username field 210 by following the username directional vector 229 for each successive character. The recipient's browser application 64 may also recursively calculate the gradient (illustrated as reference numeral 230 in FIG. 9) of the username directional vector 229 after each character in the username 174 is auto-entered. If the gradient 230 of the username directional vector 229 is a constant value or vector quantity, then the recipient's browser application 64 is assured that the username 174 is correctly entered into the username field 210. When the username 174 is completely entered and verified (using the gradient 230 of the username directional vector 229), then the password field 212 is automatically entered.

Although not shown for simplicity, the password field 212 is similarly entered. The recipient's browser application 64 retrieves the screen coordinates 214 of each character that is entered into the password field 212. The recipient's browser application 64 retrieves and places each successive character in the password 176 at the specified, corresponding coordinates. The recipient's browser application 64 ensures the characters are properly entered into the password field 212 by placing each character according to its corresponding password directional vector 242. The recipient's browser application 64 may recursively calculate the gradient 244 of the password directional vector 242 after each character in the password 176 is retrieved and auto-entered. If the gradient 244 of the password directional vector 242 is a constant value or quantity, then the recipient's browser application 64 is assured that the password 176 is correctly entered into the password field 212. When the password 176 is completely entered, the recipient's browser application 64 continues navigating the sequence 52 of uniform resource locators generated by the output file 60.

Figure 12:
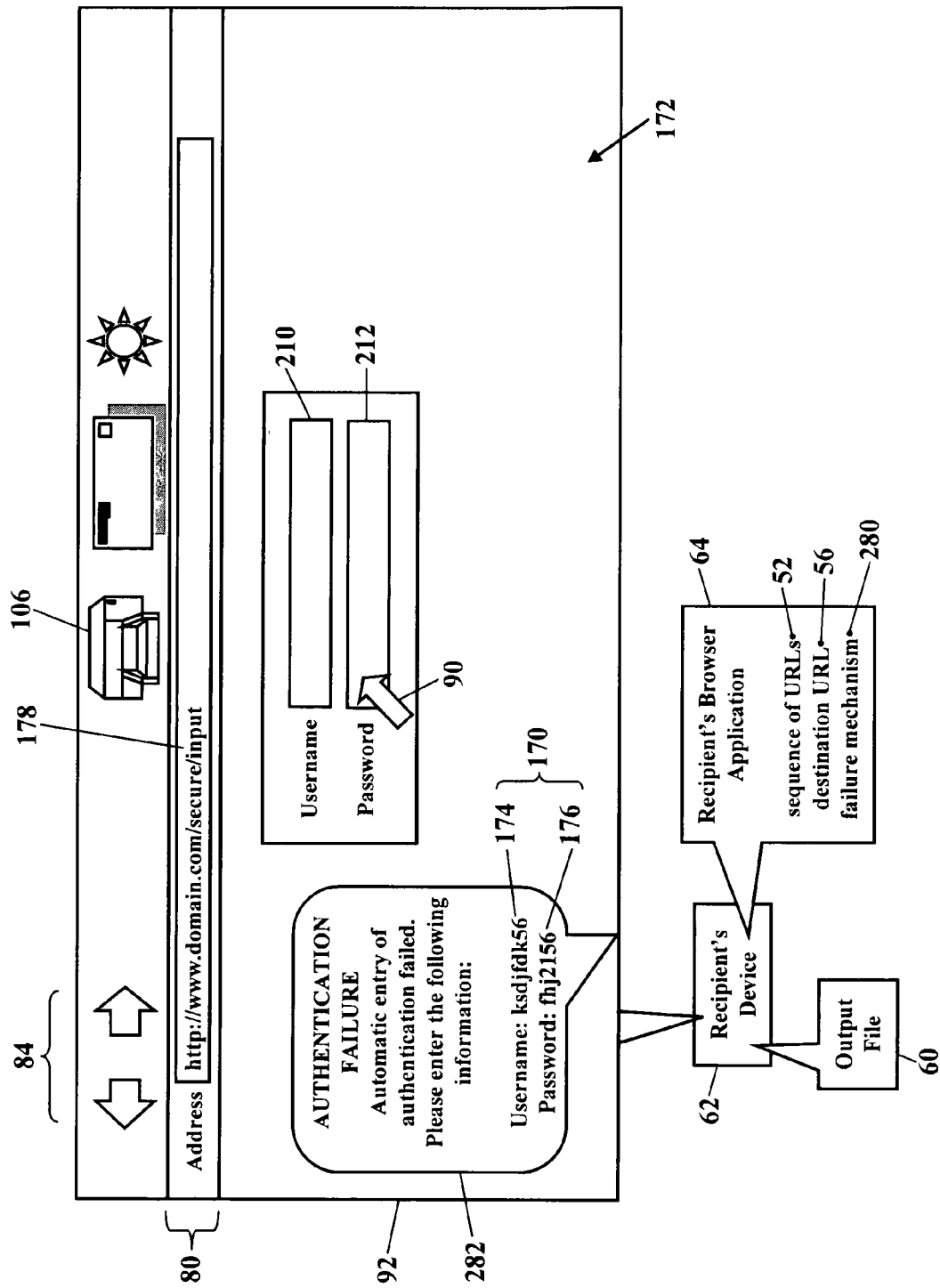
FIG. 12 is a schematic illustrating a failure mechanism, according to exemplary embodiments.

FIG. 12 is a schematic illustrating a failure mechanism, according to exemplary embodiments. As the above paragraphs explained, exemplary embodiments may auto-enter the username 174, the password 176, and any other authentication information 170. This auto-entry feature may be faster than requiring the recipient to manually enter the username 174 and password 176. Unfortunately, though, this auto-entry feature could also fail. Because the recipient's browser application 64 may attempt to automatically enter the username 174 into the username field 210, there is a possibility of a coordinate mismatch. That is, the recipient's browser application 64 may mis-locate the username field 210, such that the secure web page 172 will not accept and authenticate the username 174. Similarly, if the coordinates of password field 232 are not correctly determined, then the password 176 may result in failure. These failures may most likely result from scaling errors between the user's device 20 and the recipient's device 62. If the user's display device (illustrated as reference numeral 38 in FIG. 1) is a different resolution (e.g., the resolution illustrated as reference numeral 220 in FIG. 9) than the recipient's device 62, then the secure web page 172 may need to be scaled in size. This scaling operation may cause an error when the recipient's browser application 64 attempts to auto-enter the username 174 and the password 176. If the recipient's browser application 64 cannot enter the authentication information 170, then the recipient's browser application 64 may be prevented from navigating the sequence 52 of uniform resource locators to the destination uniform resource locator 56.

FIG. 12, then, illustrates a failure mechanism, according to exemplary embodiments. Whenever the recipient's browser application 64 receives a failure notification 280 associated with the secure web page 172, the recipient's browser application 64 may be configured to revert to manual entry of the username 174 and password 176. As FIG. 12 illustrates, the browser application 32 may display a failure dialog box 282. The failure dialog box 282 notifies the recipient that automatic entry of the authentication information 170 failed. The failure dialog box 282 may also instruct the recipient to manually enter the username 174 and password 176 associated with the uniform resource locator address 178 of the secure web page 172. The recipient may thus place the pointer 90 and manually input the username 174 and password 176 into their respective fields 210 and 212. The recipient's browser application 64 afterwards continues navigating the sequence 52 of uniform resource locators generated by the output file 60.

Figure 13:
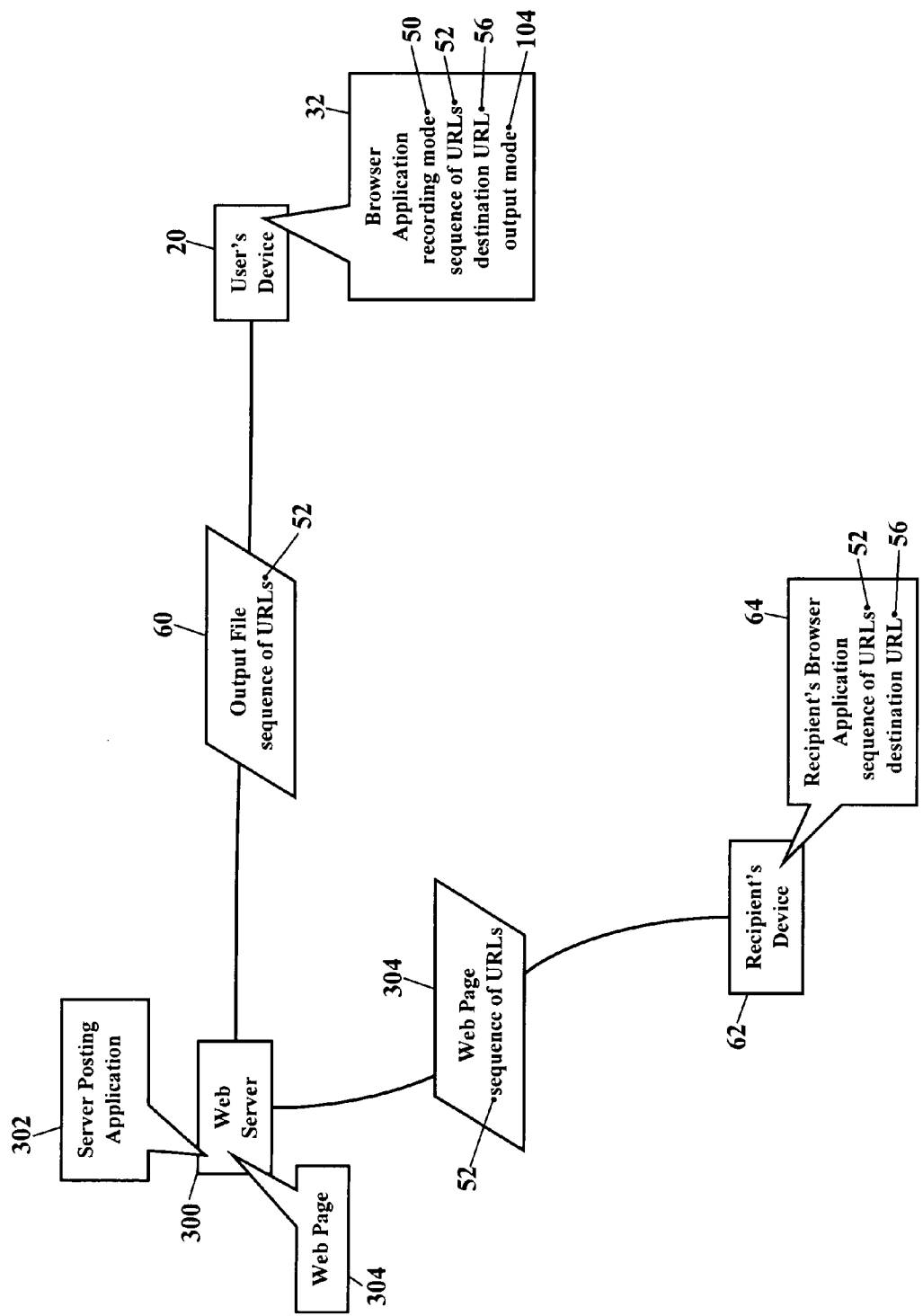
FIG. 13 is a schematic illustrating an optional output mechanism, according to exemplary embodiments.

FIG. 13 is a schematic illustrating an optional output mechanism, according to exemplary embodiments. Here the sequence 52 of uniform resource locators is posted to a website. When the user's device 20 enters the recording mode 50 of operation, the browser application 32 records the sequence 52 of uniform resource locators until the destination uniform resource locator 56 (having the corresponding destination web page 54 illustrated in FIG. 1) is reached. The user may then stop the recording process and enter the output mode 104 of operation. The browser application 32 then generates the output file 60. The output file 60 may comprise the sequence 52 of uniform resource locators to reach the destination uniform resource locator 56. Here, though, the browser application 32 sends the output file 60 to a web server 300. When the output file 60 is received at the web server 300, a server posting application 302 posts the sequence 52 of uniform resource locators to a public or secure web page 304. The recipient's browser application 64 may then request and download the web page 304 to obtain the sequence 52 of uniform resource locators. The recipient's browser application 64 may then navigate the sequence 52 of uniform resource locators to reach the destination uniform resource locator 56. The recipient's browser application 64 may additionally or alternatively download the web page 304, click or select a link to the output file 60, download the output file 60, and then execute the output file 60.

Figure 14:
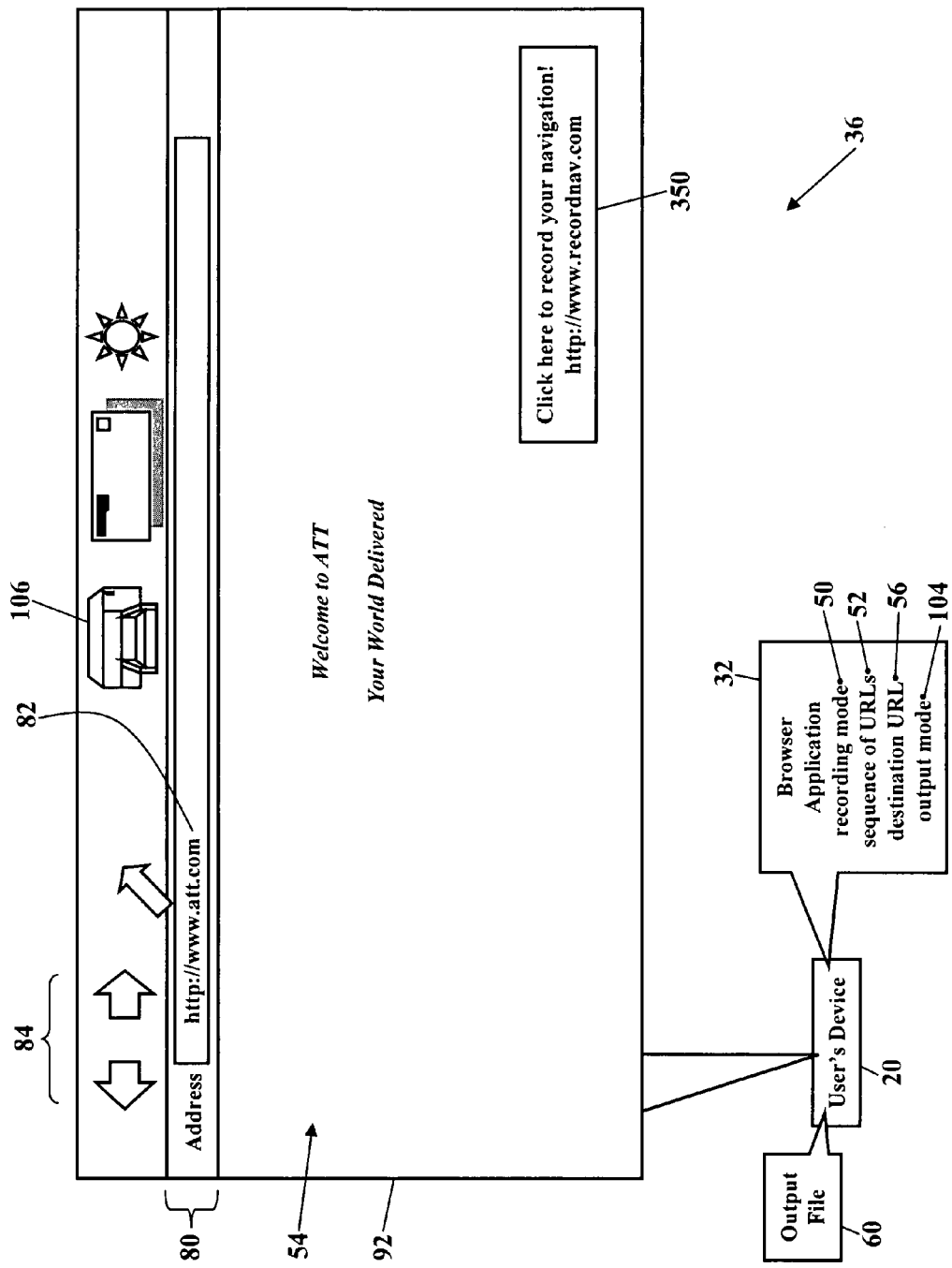
FIG. 14 is a schematic illustrating an optional recording mode 50 of operation, according to exemplary embodiments.

FIG. 14 is a schematic illustrating an optional mechanism for the recording mode 50 of operation, according to exemplary embodiments. Here the recording mode 50 of operation may be accessed via a website link 350. The graphical user interface 36 may display the website link 350 to implement the recording mode 50 of operation. When the user selects the website link 350, the user's browser application 32 requests and downloads executable script that records the sequence 52 of uniform resource locators to reach the destination web page 54. The user may optionally drag the website link 350 into the viewing pane 92 to download the executable script. Regardless, once the sequence 52 of uniform resource locators is recorded, the user's browser application 32 enters the output mode 104 of operation and generates the output file 60.

Figure 15:
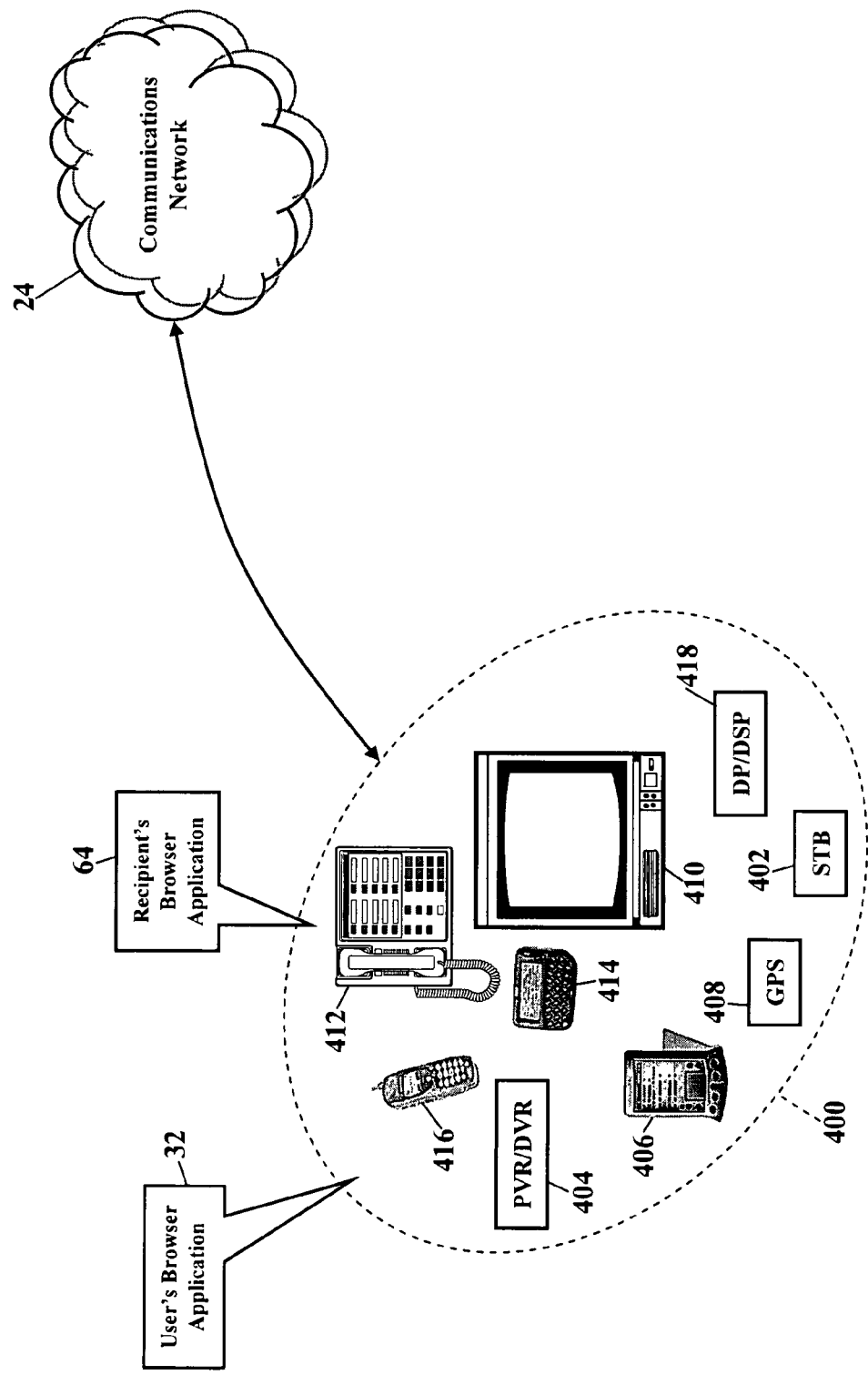
FIG. 15 depicts other possible operating environments for additional aspects of the exemplary embodiments.

FIG. 15 depicts other possible operating environments for additional aspects of the exemplary embodiments. FIG. 15 illustrates that the user's browser application 32 and/or the recipient's browser application 64 may alternatively or additionally operate within various other devices 400. FIG. 15, for example, illustrates that the user's browser application 32 and/or the recipient's browser application 64 may entirely or partially operate within a set-top box (402), a personal/digital video recorder (PVR/DVR) 404, personal digital assistant (PDA) 406, a Global Positioning System (GPS) device 408, an interactive television 410, an Internet Protocol (IP) phone 412, a pager 414, a cellular/satellite phone 416, or any computer system and/or communications device utilizing a digital processor and/or a digital signal processor (DP/DSP) 418. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01)); the GSM Standard 11.11, formally known as *Specification of the Subscriber Identity Module—Mobile Equipment (Subscriber Identity Module—ME) interface* (GSM 11.11 V5.3.0 (1996-07)); MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Figure 16:
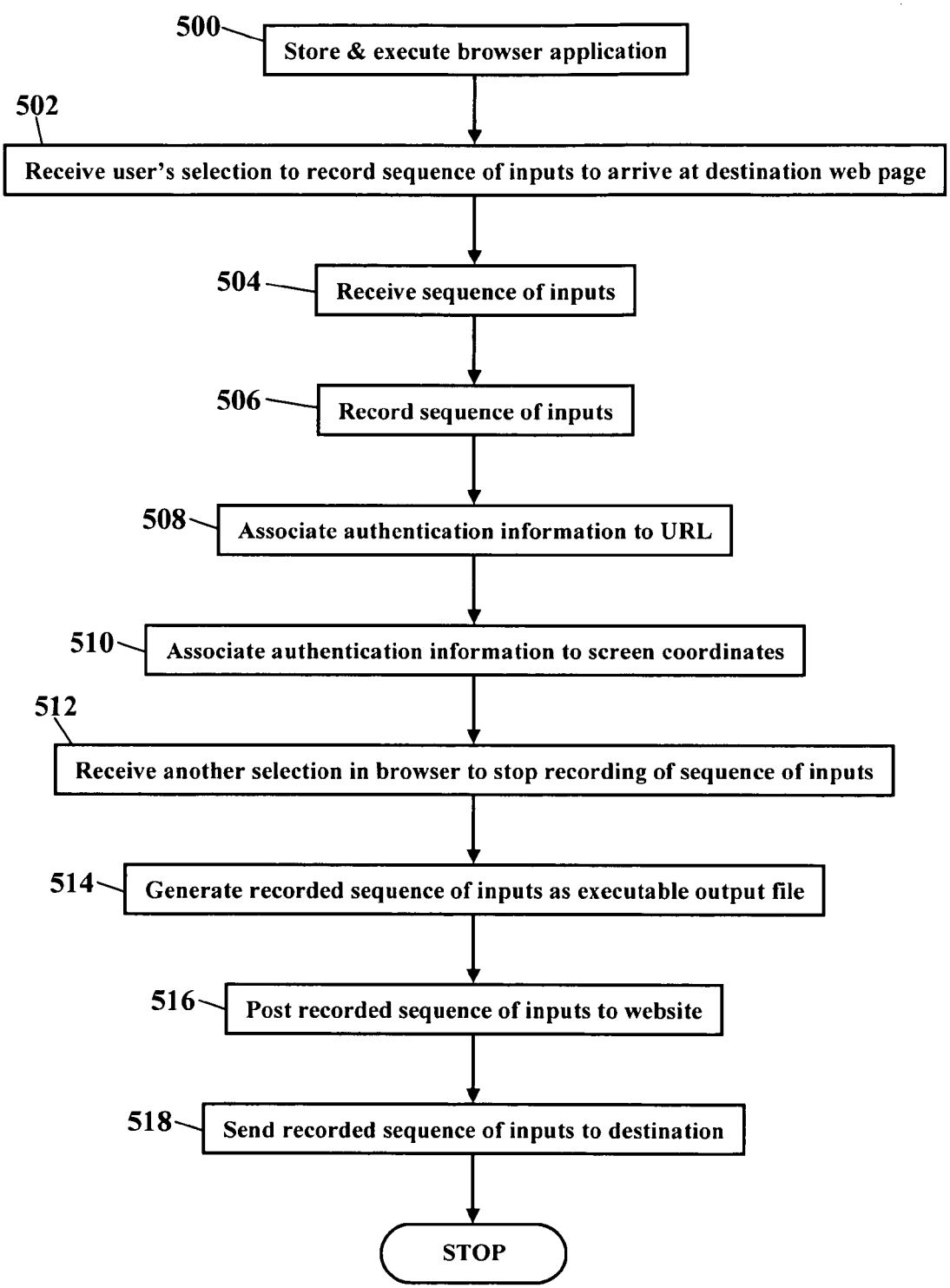

FIG. 16 is a flowchart illustrating a method of recording a navigational sequence, according to exemplary embodiments. A browser application 32 is stored in memory and executed by the processor 30 in the user's device 20 (Block 500). A user's selection is received by the processor 30 to record a sequence of inputs to arrive at a destination web page (Block 502). The sequence of inputs is received (Block 504) and recorded by the processor 30 in the memory 34 (Block 506). Authentication information 170 may be associated by the processor 30 to a uniform resource locator (Block 508). Authentication information 170 may also be associated by the processor 30 to screen coordinates 214 (Block 510). Another selection is received in the browser application 32 to stop the recording of the sequence of inputs (Block 512). The recorded sequence of inputs is generated by the processor 30 as an executable output file (Block 514). The recorded sequence of inputs may be posted to a website (Block 516) and/or sent to a destination (Block 518).

FIG. 17 is a flowchart illustrating another method of recording a navigational sequence, according to exemplary embodiments. An output file is retrieved by the recipient's device 62 that stores a sequence of inputs to a browser application (Block 600). The output file is executed by the recipient's browser application 64 (Block 602). The recipient's browser application 64 performs a navigation specified by the output file to download a destination web page (Block 604).

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for recording navigational inputs to a browser application.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of recording a navigational sequence, comprising:
   retrieving a browser from memory that causes display of a graphical user interface;
   receiving a selection from a user of an icon in the graphical user interface to start recording a sequence of inputs to the browser;
   entering a recording mode of operation for the browser in response to the selection of the icon;
   receiving the sequence of inputs to the browser;
   recording the sequence of inputs in the memory;
   requesting a destination web page;
   establishing a timer that begins counting down from receipt of the destination web page;
   inferring navigation has ended in response to the timer elapsing without requesting another web page;
   automatically stopping the recording of the sequence of inputs; and
   exiting the recording mode of operation.

2. The method according to claim 1, further comprising retrieving an executable file that stores the sequence of inputs to the browser.

3. The method according to claim 1, further comprising outputting a recorded sequence of inputs as an output.

4. The method according to claim 3, further comprising sending the output to a destination.

5. The method according to claim 1, further comprising generating an executable file that, when executed by another browser, navigates the another browser to the destination web page.

6. The method according to claim 1, further comprising recording authentication information that the user enters when navigating to the destination web page.

7. The method according to claim 1, further comprising posting a recorded sequence of inputs to a web site.

8. A system for recording a navigational sequence, comprising:
   a processor; and
   memory storing a browser application that when executed causes the processor to perform operations, the operations comprising:
   receiving a selection from a user of an icon in a graphical user interface that starts recording a sequence of keyboard inputs to the browser application;
   entering a recording mode of operation for the browser application in response to the selection of the icon;
   receiving the sequence of keyboard inputs in a field of the graphical user interface;
   recording the sequence of keyboard inputs in the memory;
   requesting a destination web page;
   establishing a timer that begins counting down from receipt of the destination web page;
   inferring navigation has ended in response to the timer elapsing without requesting another web page;

automatically stopping the recording of the sequence of keyboard inputs; and exiting the recording mode of operation.

9. The system according to claim 8, wherein the browser application further causes the processor to perform the operations of retrieving an executable file that stores the sequence of keyboard inputs.

10. The system according to claim 8, wherein the browser application further causes the processor to perform the operations of outputting a recorded sequence of keyboard inputs.

11. The system according to claim 8, wherein the browser application further causes the processor to perform the operations of sending the recorded sequence of keyboard inputs to a destination.

12. The system according to claim 8, wherein the browser application further causes the processor to perform the operations of generating an executable file that, when executed by another browser application, navigates to the destination web page.

13. The system according to claim 8, wherein the browser application further causes the processor to perform the operations of recording authentication information entered into the field while navigating to the destination web page.

14. The system according to claim 8, wherein the browser application further causes the processor to perform the operations of posting a recorded sequence of keyboard inputs to the destination web page.

15. A memory storing instructions that when executed cause a processor to perform operations for recording a navigational sequence, the operations comprising:

processing a browser application that causes display of a graphical user interface;

receiving a selection from a user of an icon in the graphical user interface;

entering a recording mode of operation for the browser application in response to the selection of the icon;

starting recording a sequence of keyboard inputs to a field in the browser application;

requesting a destination web page;

establishing a timer that begins counting down from receipt of the destination web page;

inferring navigation has ended in response to the timer elapsing without requesting another web page;

automatically stopping the recording of the sequence of keyboard inputs;

exiting the recording mode of operation in response to an inference that the navigation has ended; and generating an executable file that, when executed, navigates to the destination web page.

16. The memory according to claim 15, further comprising instructions for retrieving the executable file.

17. The memory according to claim 16, further comprising instructions for sending the executable file to a destination.

18. The memory according to claim 15, further comprising instructions for emailing the executable file to a destination address.

19. The memory according to claim 15, further comprising instructions for timestamping each keyboard input in the sequence of keyboard inputs.

20. The memory according to claim 15, further comprising instructions for posting a recorded sequence of keyboard inputs to a web site.

* * * * *